United States Patent [19]
Barlow et al.

[11] 3,803,570
[45] Apr. 9, 1974

[54] SENSING OF MOISTURE CONTENT IN SOIL

[75] Inventors: Wayne K. Barlow, Logan; Eric C. Campbell, Providence; Reed G. Crockett, River Heights, all of Utah

[73] Assignee: Wescor, Inc., Logan, Utah

[22] Filed: Feb. 15, 1972

[21] Appl. No.: 226,587

[52] U.S. Cl. ............... 340/235, 340/373, 324/65 P
[51] Int. Cl. ......................................... G08b 21/00
[58] Field of Search........... 340/373, 235; 73/304 R, 73/304 C; 324/65 P, 65 R

[56] References Cited
UNITED STATES PATENTS
| | | | |
|---|---|---|---|
| 2,437,134 | 3/1948 | Smith | 324/65 R |
| 1,248,633 | 12/1917 | Doak | 340/235 |
| 2,812,976 | 11/1957 | Hasenkamp | 340/235 |
| 3,129,413 | 4/1964 | Watson | 340/235 |
| 3,247,500 | 4/1966 | Grazio | 340/248 B |

Primary Examiner—Thomas B. Habecker
Attorney, Agent, or Firm—Mr. Lynn G. Foster

[57] ABSTRACT

A moisture sensing apparatus and method, the apparatus comprising a capacitive moisture sensing probe insertable into the earth at a desired location and establishing an electrical signal indicative of the moisture content of the earth at said desired location, a servomechanism energized by said signal, and a semaphore positionable by said servomechanism to provide a visual indication of the moisture content of said soil. A system is also disclosed for permitting the moisture sensing device to control distribution of water to the soil in response to said signals.

8 Claims, 6 Drawing Figures

SENSING OF MOISTURE CONTENT IN SOIL

BACKGROUND

1. Field of Invention

This invention relates to methods and apparatus for detecting moisture and is particularly directed to apparatus for and methods of ascertaining and communicating the moisture content of soil.

In agriculture, the quality and yield of crops are usually directly related to the moisture content of the soil and, in many areas of the world, the moisture content of the soil is controlled primarily by irrigation. The same can be said of grass on golf courses and the like. Innumerable techniques are available for supplying water to the soil and controlling the quantity and time of application of such water to the soil. However, it is apparent that, in order to make judicious and economical use of such techniques, some provision must be made for measuring the moisture content of the soil so as to determine when and how much additional water must be supplied to maintain optimum growing conditions for each given crop, or other vegetation, when considering soil type and climate.

2. Prior Art

Historically, farmers, caretakers, gardeners and the like have relied upon visual observation of the condition of crops, grass, etc., and the texture or "feel" of the soil to determine soil moisture content. More recently, scientists and researchers have developed instruments for measuring the moisture content of soil. However, the instrument of the scientist and researcher are generally unsuited for use by the farmer and, often, the information provided by such instruments is of little, if any, use to the farmer. In many instances, the scientific instruments are complex and are capable of use only by persons having extensive specialized training. Furthermore, the scientists are often interested only in acquiring comparative data from a plurality of locations and the instruments are designed for direct reading. In contrast, the farmers, caretakers, gardeners, etc. are interested in maintaining a desired moisture level throughout a crop, grass or like area, which may cover hundreds of acres and, since most irrigation systems are controlled from more or less central locations, it would be desirable for the farmer, gardener, or caretaker at the control point of the irrigation system to be able to determine the moisture content of the soil at any and all points served by the irrigation system.

BRIEF SUMMARY AND OBJECTS OF INVENTION

These disadvantages of the prior art are overcome with the present invention and a soil moisture indicating apparatus and method are provided which can be installed quickly and easily by semi-skilled workers, can withstand exposure to weather over long periods of time, requires virtually no maintenance, yet provides continuous accurate indications of the moisture content which indications can be readily and unerringly communicated to the farmer at locations remote from the indicating apparatus.

The advantages of the present invention are preferably attained by providing a moisture sensing system, including methods and apparatus, wherein the apparatus comprises a capacitive moisture probe insertable into the earth at a desired location and establishes an electrical signal having a magnitude indicative of the moisture content of the soil along the length of the probe at said desired location, a mechanism energized by said signal, and a semaphore or other responsive device positionable or actuated by said mechanism to either provide a visual or other indication of the moisture content of said soil or to cause moisture to be withheld or delivered to the location in question commensurate with the soil moisture indication.

In its preferred form, the present invention provides a novel mechanism for converting electrical energy into mechanical energy. Also, a long distance visual indication of an existing environment condition, such as temperature or moisture content, is provided.

Accordingly, it is an object of the present invention to provide improved soil moisture indicating methods and apparatus.

Another object of the present invention is to provide a soil moisture indicating system which can be installed by semi-skilled persons.

A further object of the present invention is to provide a highly accurate soil moisture indicating system which can withstand weather over long periods and which can operate continuously during such periods with little or no maintenance.

An additional object of the present invention is to provide soil moisture indicating methods and apparatus which apparatus is readily readable from a remote location.

A specific object of the present invention is to provide a soil moisture indicating apparatus comprising a capacitive moisture probe insertable into the earth at a desired location and establishing an electrical signal having a magnitude accurately indicative of the moisture content of the soil at said desired location, a servomechanism energized by said signal, and a semaphore positionable by said servomechanism to provide a visual indication of the moisture content of said soil.

A further significant object is the provision of a novel mechanism for converting electrical energy into mechanical energy.

Another important object of this invention is the provision of a novel long distance visual indicator of an existing environmental condition.

These and other objects and features of the present invention will be apparent from the following detailed description, taken with reference to the accompanying drawings.

DETAILED DESCRIPTION OF ILLUSTRATED EMBODIMENT

Figure 1:
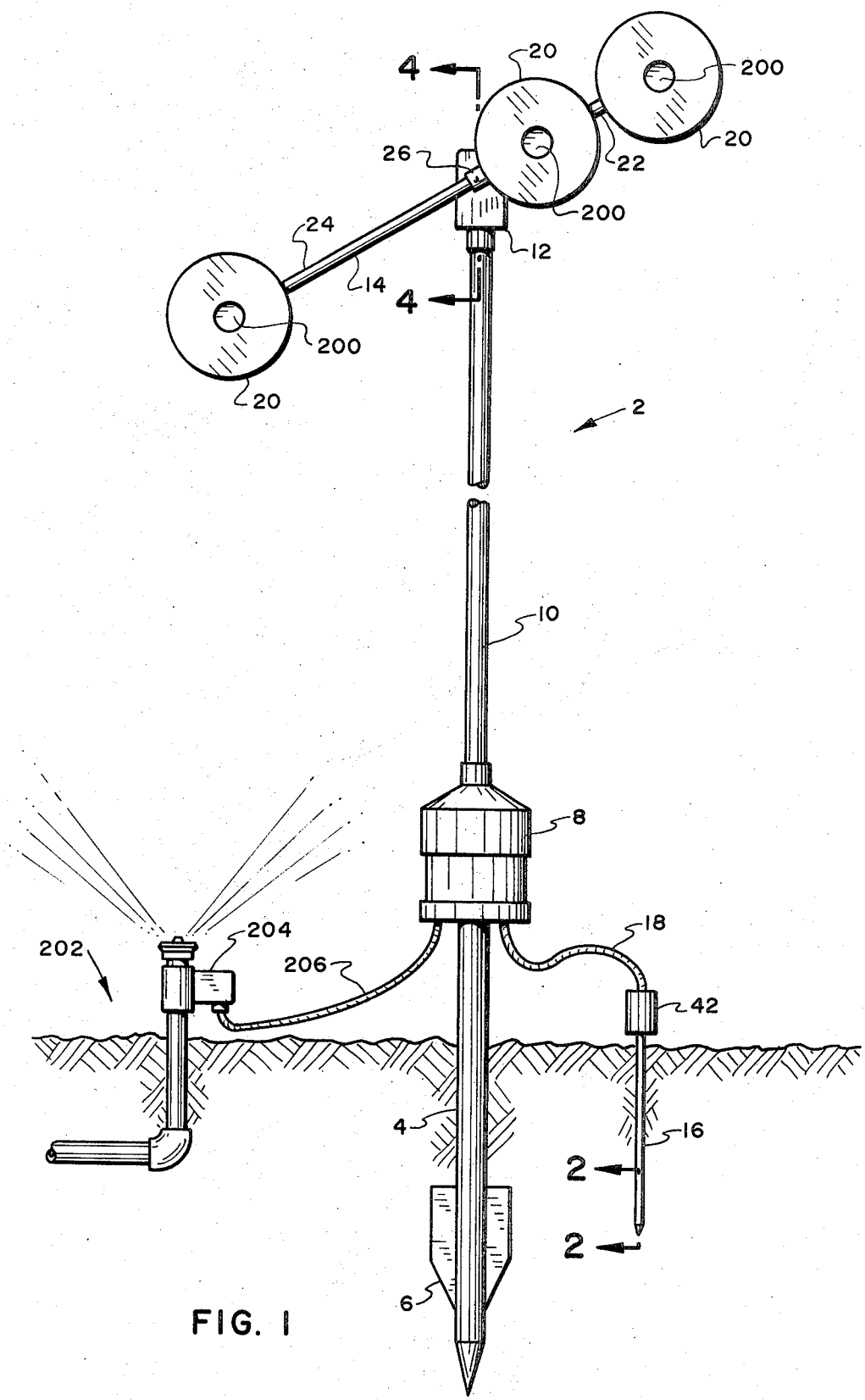
FIG. 1 is a diagrammatic representation of a soil moisture indicating system embodying the present invention.

In that form of the present invention chosen for purposes of illustration, FIG. 1 shows a soil moisture indicating system indicated generally at 2, having a support assembly 4 formed with a soil anchor 6 at the lower end of the staff of the assembly 4, a power supply unit 8 mounted on the support assembly staff 4, a hollow mast 10 extending upward from the power supply unit 8, a servomechanism 12 mounted adjacent the upper end of the mast 10, a semaphore arm 14 mounted for rotation by the servomechanism 12, and a sensing probe 16 connected by a flexible conductor 18 to the power supply unit 8 and, through the interior of the mast 10, to the servomechanism 12. A pair of signal flags, lights or discs 20 are mounted in proximity with each other adjacent one end 22 of the semaphore arm 14, while a single signal flag, light or disc 20 is mounted adjacent the opposite end 24 of the semaphore arm 14. The semaphore arm 14 is mounted at its center of balance 26 to the servomechanism 12.

Figure 2:
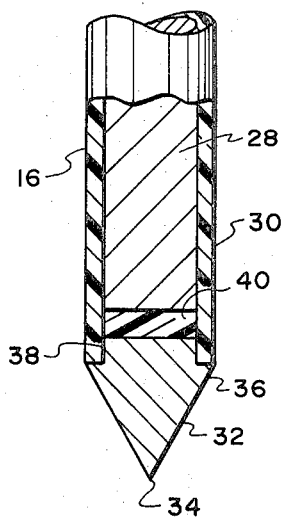
FIG. 2 is a fragmentary vertical section through the sensing probe of FIG. 1, taken on the line 2—2 thereof.

As seen in FIGS. 1 and 2, the probe 16 comprises an elongated metal rod 28 which is encircled by a sleeve 30 formed of electrically insulating, moisture impervious material, such as polyethylene. To facilitate penetration into the earth, a generally conical metal tip 32 is provided which tapers outwardly from its pointed leading end 34 to a skirt 36 having a diameter substantially equal to the outer diameter of the sleeve 30.

The tip 32 is also formed with a rear projection 38, having a diameter substantially equal to that of the rod 28, which mates within the end of the sleeve 30. The tip 32 is electrically insulated by a dielectric plug 40 formed of suitable material, such as epoxy, which is interposed between the rear projection 38 and the adjacent end of the rod 28 and may, if desired, also serve as a bonding agent to secure the tip 32 to the sleeve 30. The electronic sensing circuitry is encapsulated and the encapsulated circuitry is molded to and serves as a manipulating handle for the probe 16, as seen at 42.

Figure 3:
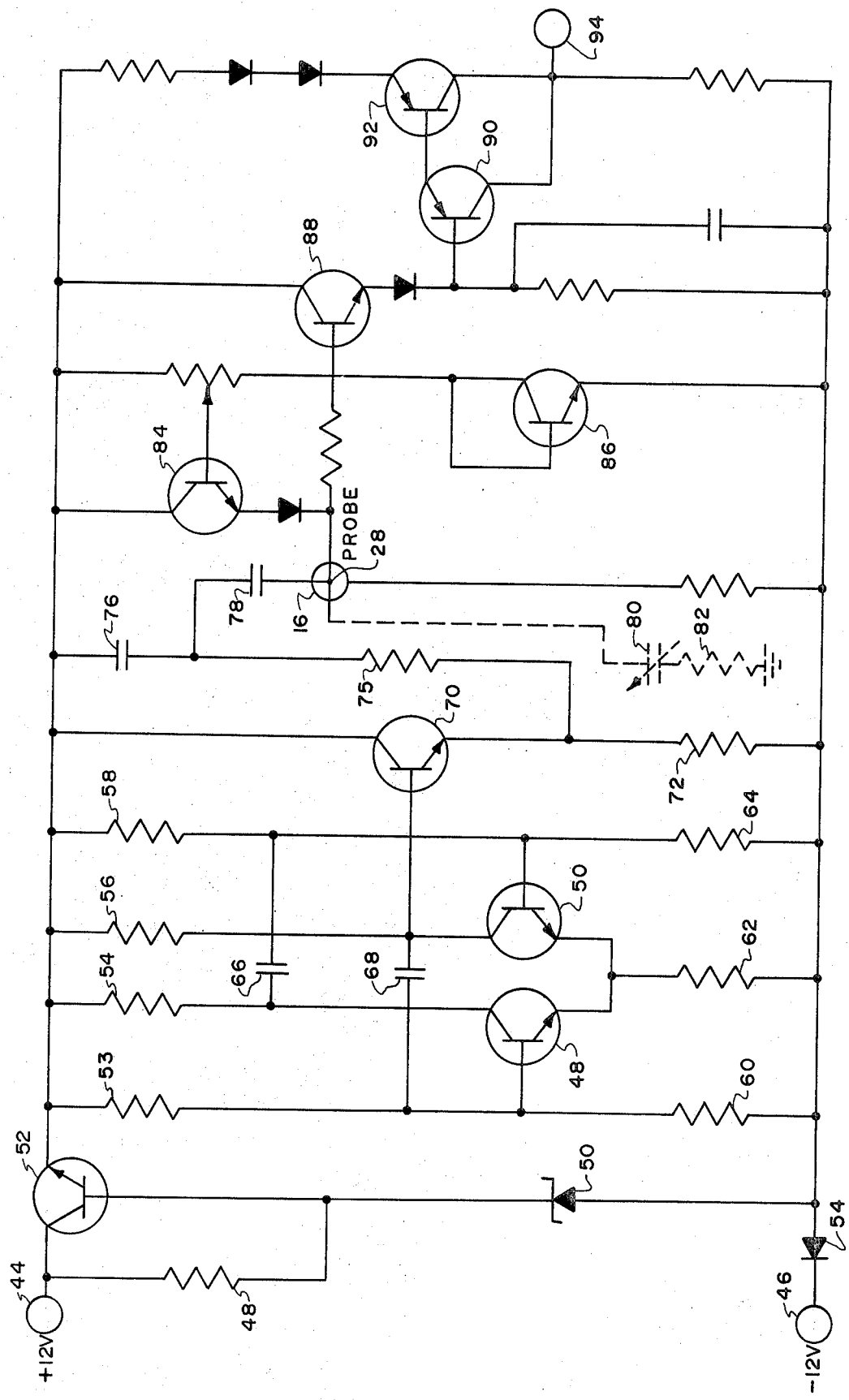
FIG. 3 is a circuit diagram of the electrical circuitry of the sensing probe of FIG. 1.

FIG. 3 illustrates the electronic circuitry which is encapsulated within the handle 42 of the probe 16. The circuit, in the form illustrated, may be energized by any direct current, twelve volt source. Preferably, the source is an automotive battery which is mounted within a weatherproof housing carried by the support assembly 4, as indicated at 8.

In the sensing circuit of FIG. 3, the positive terminal of the power supply unit 8 is connected to terminal 44, while the negative terminal of the power supply unit 8 is connected to terminal 46 and is also connected to ground through the support assembly 4. Resistor 48, Zener diode 50 and transistor 52 constitute a voltage regulator which is connected across the terminals 44 and 46 to prevent fluctuations in the voltage of the power supply unit 8 from effecting the sensing circuitry. Diode 54 protects the sensing circuit against damage due to reversal of polarity of the voltage applied to terminals 44 and 46. The output of the voltage regulator is applied to drive a sawtooth oscillator formed by transistors 48 and 50, resistors 53–64, and capacitors 66 and 68. The sawtooth signal from this oscillator is passed through a buffer, formed by transistor 70, resistors 72 and 74, and capacitor 76, and is coupled by capacitor 78 to shaft 28 of the probe 16. The circuit path through the support assembly 4, the earth and probe 16 appear to the sensing circuit as a series-connected variable capacitor and resistor path to ground, as indicated at 80 and 82. The value of the variable capacitance 80 is determined by the moisture content of the earth. The signal from the probe 16 is amplified by transistors 84, 86 and 88 and is passed to a differentiator, formed by transistors 90 and 92, which converts the probe signal into a direct current, analog signal appearing at output terminal 94.

Figure 5:
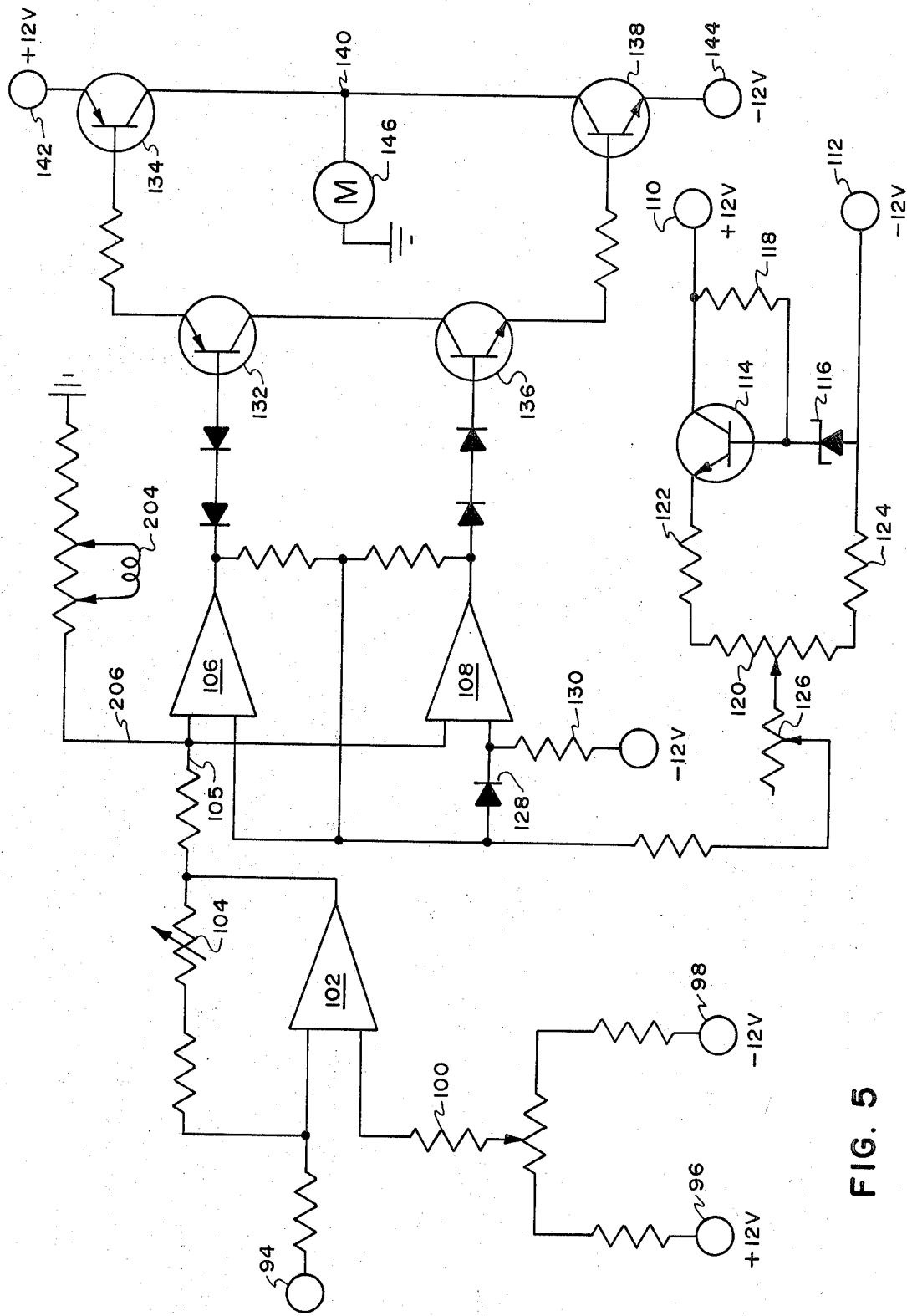
FIG. 5 is a circuit diagram of the electrical circuit of the servomechanism of FIG. 1.

FIG. 5 illustrates the circuitry of the servomechanism 12. As shown, the power supply unit 8 is connected to terminals 96 and 98 and acts through potentiometer 100 to apply energy to one input of an operational amplifier 102. The probe signal, at terminal 94, is applied to the second input of operational amplifier 102 and a feedback path, including variable resistor 104 is connected in parallel with operational amplifier 102. Potentiometer 100 and variable resistor 104 are adjustable to cancel out signal variations due to production differences in the probes and soil variations, such as would result from moving the moisture indicating device from one location to another. The output of operational amplifier 102 is applied via conductor 105 to one input of each of two operational amplifiers 106 and 108, which serve as level detectors. The second inputs to operational amplifiers 106 and 108 are provided from the power supply unit 8 via terminals 110 and 112; the voltage regulator formed by transistor 114, Zener diode 116 and resistor 118; the voltage divider formed by potentiometer 120 and resistors 122 and 124; and potentiometer 126. Potentiometer 120 is driven by and serves to indicate the position of the semaphore arm 14 while 126 is adjustable to cause the voltage range of the servomechanism 12 to correspond to 180° rotation of the semaphore arm 14. Diode 128 and resistor 130 provide approximately a five volt differential between the actuation levels of operational amplifiers 106 and 108. The signals passed by operational amplifier 106 are amplified by transistor 132 and are applied to the base of transistor 134. Similarly, the signals passed by operational amplifier 108 are amplified by transistor 136 and applied to the base of transistor 138. The collectors of transistors 136 and 138 are connected to a common junction 140, while the emitter of transistor 136 is connected to the positive side of the power supply unit 8 at terminal 142 and the emitter of transistor 138 is connected to the negative side of the power supply unit 8 at terminal 144. A reversible servomotor 146 is connected between the common junction 140 and ground and serves to drive the semaphore arm 14.

Figure 4:
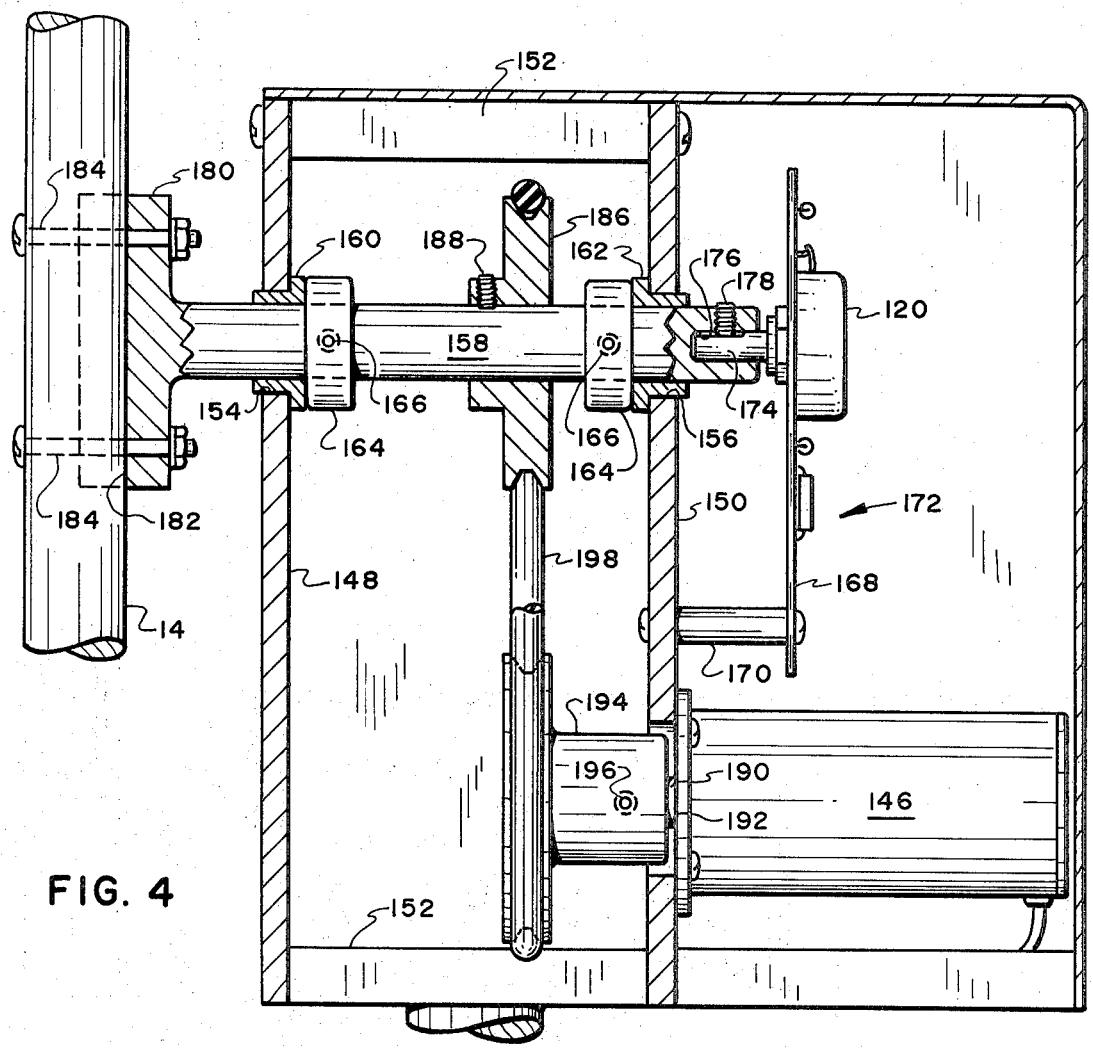
FIG. 4 is a vertical section through the servomechanism of FIG. 1, taken on the line 4—4.

FIG. 4 is a section through the servomechanism 12.

As shown, the servomechanism 12, which converts voltage signals to mechanical displacement, comprises a front plate 148 and a rear plate 150 which are preferably generally rectangular and are secured in spaced relation by suitable spacer bars 152 adjacent the respective corners thereof. The plates 148 and 150 are formed with aligned openings 154 and 156 and a shaft 158 is rotatably journaled therein, as by bearings 160 and 162. The shaft 158 projects outwardly from the plates 148 and 150 and is secured in a desired axial position by collars 164 and set screws 166. An electronic circuit board 168 is mounted in spaced relation rearwardly of plate 150, as by studs 170, and the components of the circuit of FIG. 5 are mounted thereon, as indicated generally at 172. The potentiometer 120 has a shaft 174 which projects through the circuit board 168 and is received within a recess 176 formed in the adjacent end of the shaft 158. A suitable non-rotatable coupling, such as set screw 178, serves to secure the potentiometer shaft 174 for rotation with shaft 158. At its opposite end, shaft 158 carries an arm support member 180 having a semi-cylindrical recess 182 formed in the outer face thereof to receive the cylindrical semaphore arm 14. Suitable fasteners, such as U-clamps 184, serve to rigidly secure the semaphore arm 14 to the support member 180. Between the plates 148 and 150, the shaft 158 carries a pulley 186 and is secured for rotation therewith, as by set screw 188. The servomotor 146 is mounted on the plate 150 and has a shaft 190 which projects through an opening 192 in the plate 150 and has a pulley 194 mounted for rotation thereby, as by set screw 196. A drive belt 198 couples the pulleys 186 and 196 and, thus, permits servomotor 146 to drive the semaphore arm 14. The servomechanism 12 is preferably enclosed within a weatherproof housing, not shown, which is provided with suitable fasteners for securing the servomechanism 12 atop the mast 10, as seen in FIG. 1. The flags 20 may be of any desired shape and may be secured to the semaphore arm 14 by any suitable fastening technique. Preferably, the flags 20 are of flexible plastic material which will yield to heavy wind forces and are provided with a high visibility coating, such as fluorescent paint, to facilitate daytime observance, and carry retrodirective reflectors 200 to facilitate observation at night. The long distance visual signaling portion of this invention can also be used for other purposes; for example, to signal the instantaneous temperature in an orchard where freezing is expected.

Where an irrigation system is provided, as indicated at 202 in FIG. 1, a solenoid valve 204, or the like, may be connected to the conductor 105 of the circuit of FIG. 5, as by conductor 206, to cause the valve 204 to be actuated by the output of operational amplifier 102 to control the application of water to the land, as well as to indicate the moisture content by the relative positions of flags 20. Obviously, a series of moisture sensing systems 2 could be ganged together for stepped actuation depending on time, available water pressure and/or need for moisture as determined by the systems.

Figure 6:
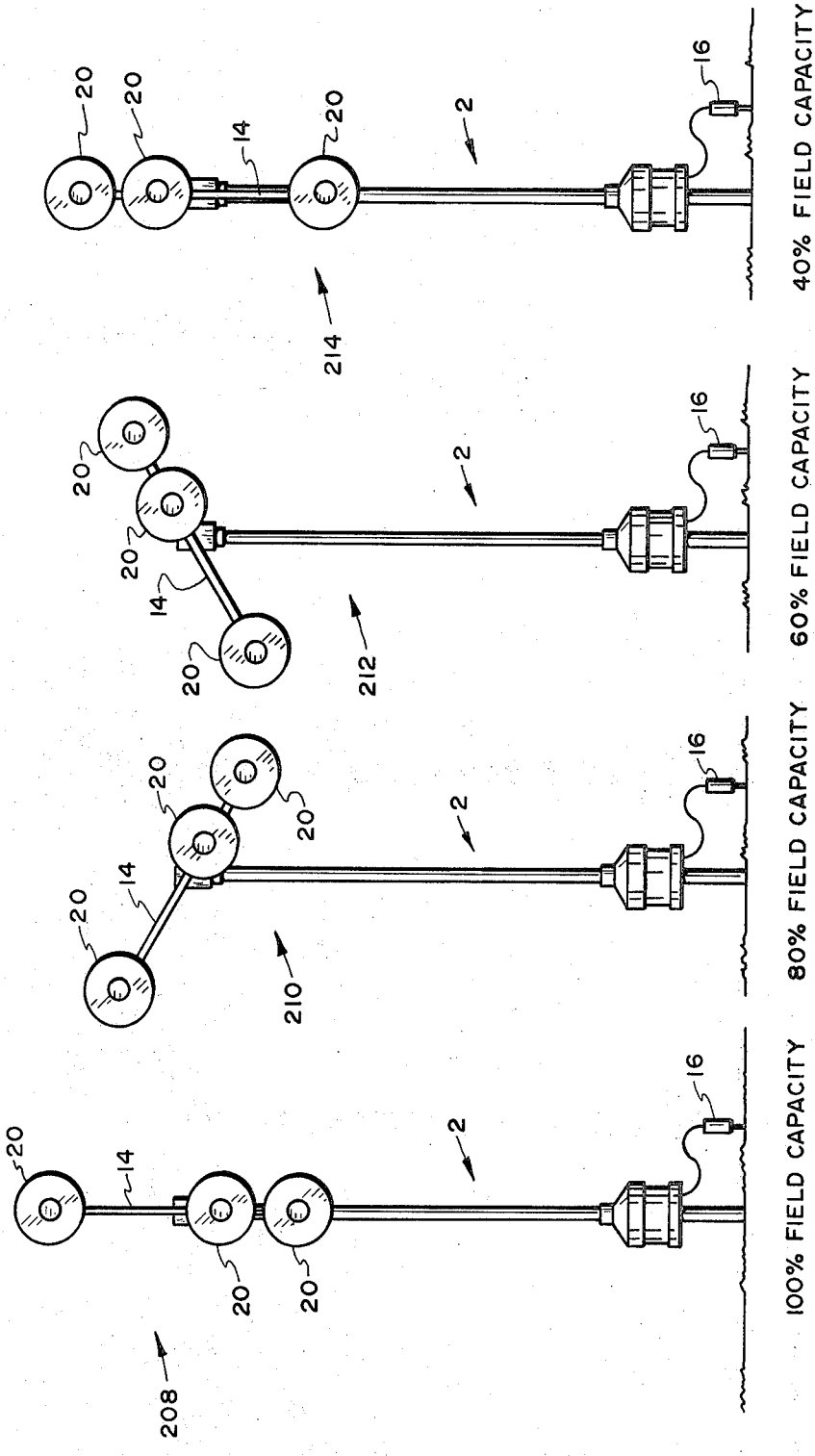
FIG. 6 is a diagrammatic representation showing a plurality of soil moisture indicating systems, of the type shown in FIG. 1, with the semaphores thereof indicating respective moisture levels.

In use, a plurality of the moisture sensing units 2 may be disposed in spaced relation about the land, as seen in FIG. 6. As indicated above, the moisture content of the earth between the support assembly 4 and the probe 16 determines the value of the capacitance 80 in the sensing circuit of FIG. 3 as an integration along the entire length of the probe 16. The sensing circuit of FIG. 3 determines the ratio of the capacitance actually sensed to that when the field is saturated and applies a signal, indicative of this ratio, through terminal 94 to the servo circuitry of FIG. 5. The operational amplifiers 106 and 108 of the servo circuitry of FIG. 5 compare this signal with the signal from potentiometer 120, which corresponds to the position of the semaphore arm 14, and, when necessary, apply signals to adjust the position of the semaphore arm 14 to provide a visual indication corresponding to the value of the moisture content sensed by the sensing circuit. If the signal from the sensing circuit, appearing on input 94 of the servo circuit of FIG. 5, is greater than the signal from potentiometer 120, operational amplifier 106 will pass a signal to cause transistor 134 to conduct and pass current to actuate servomotor 146 to rotate semaphore arm 14 in a clockwise direction. Conversely, if the signal from the sensing circuit is less than the signal from potentiometer 120, operational amplifier 108 will pass a signal to cause transistor 138 to conduct and pass current to actuate servomotor 146 to rotate semaphore arm 14 in a counter clockwise direction. When the field contains the maximum possible moisture, the semaphore arm 14 will be raised to the position indicated at 208, in FIG. 6, and, as the moisture content of the field is reduced, the semaphore arm 14 will be rotated counterclockwise. Thus, as the field dries out, the semaphore arm 14 will pass, successively, through the positions seen at 210 and 212 to the position seen at 214. Conversely, when water is added to the field, the semaphore arm 14 will be rotated clockwise toward the position seen at 208. Thus, by observing the positions of the semaphore arms 14 of the moisture sensing devices 2, the user may determine the moisture requirements of the various portions of his land in which the respective moisture sensing devices 2 are located. Consequently, the farmer, gardener or caretaker can plan the distribution of water to the land for maximum efficiency. Moreover, by properly positioning the moisture sensing devices 2, the user can observe several or all of the semaphore arms 14 from a central location, for example, the control point of an irrigation system, and can determine the moisture requirements of the entire farm from the central location, without the necessity of travelling over the land to personally determine these requirements. Furthermore, as indicated above, the moisture sensing devices 2 may be connected to control solenoid valves 204 to actually regulate the supply of water to the land as needed. Thus, the solenoid valve 204 could be made to turn on when the moisture level and, hence, the signal from operational amplifier 102, falls to 60% capacity, as indicated at 212 in FIG. 6, and to turn off when the moisture level, and the signal from operational amplifier 102 rises to the 80 percent level, as indicated at 210 in FIG. 6. At night, the user could check the moisture content by aiming a spotlight toward the moisture sensing apparatus 2 and observing the light reflected by the retrodirective reflectors 200 of the flags 20 on the semaphore arms 14.

Obviously, numerous variations and modifications may be made without departing from the present invention. Accordingly, it should be clearly understood that the form of the present invention described above and shown in the accompanying drawings is illustrative only and is not intended to limit the scope of the invention.

What is claimed is:
1. A soil moisture field measuring apparatus comprising: earth insertable probe means,
   support means,
   circuit means coupled to said probe means for monitoring the instantaneous magnitude of an electrical characteristic of the moisture content of said earth said circuit means having a variable electrical output signal proportional to the instantaneous value of percentage soil moisture within the range between zero and saturation,
   signaling means; and
   servo means responsive to said output signal to position said signaling means in a range of indications corresponding to said soil moisture, said servo means and said signaling means being supported above ground by said support means.

2. The device of claim 1 wherein said signaling means comprises:
semaphore means.

3. The device of claim 2 wherein said semaphore means comprises:
an arm pivotally carried on said support means and radially positionable by said servo means,
flag means carried by said arm.

4. The device of claim 3 wherein:
said arm is centrally pivotally carried up on the support means,
said flag means comprise dissimilar visual indicators mounted to the arm on opposite sides of the central pivot site.

5. The device of claim 1 wherein said circuit means are electrically connected to and energized by a battery.

6. The device of claim 1 wherein said apparatus comprises:
an elongated shaft, comprising said probe means, formed of electrically conductive material and having a tip portion formed to facilitate insertion into the earth, and
a protective sleeve disposed about said shaft and extending along the entire length of said shaft except for said tip portion.

7. A soil moisture system comprising a plurality of soil moisture monitoring units for distribution through a substantial area of land, each unit comprising:
earth insertable probe means,
support means,
circuit means coupled to said probe means serving for monitoring the instantaneous magnitude of an electrical characteristic of the moisture content of said earth said circuit means having a variable electrical output signal proportional to the instantaneous value of percentage soil moisture within the range between zero and saturation,
signaling means; and
servo means responsive to said output signal to position said signaling means in a range of indications corresponding to said soil moisture, said servo means and said signaling means being supported above ground by said support means.

8. A portable and self-contained field soil moisture detecting apparatus comprising:
a portable source of electrical energy,
probe means for insertion into the soil comprising electronic means sensing an electrical characteristic of the soil which is proportional to said soil moisture, electronic means creating an electrical signal representative of the sensed characteristic and electrical cable means connecting the probe means to the source,
a ground-engaging mast projecting a substantial distance into the air and on which the electrical energy source is carried,
long distance visual signaling means the angular orientation of which is an accurate representation of soil moisture at the probe means carried in an elevated position above the ground by the mast,
a servo means mounted in an elevated location upon the mast and having means connected to and controlling the orientation of the signaling means, and means communicating to the control input means of the servo means the electrical signal representative of the soil moisture condition sensed by the probe means causing angular reorientation of the signaling means when the prior angular orientation is not accurately indicative of the present soil moisture condition.

* * * * *